United States Patent [19]

Yasui et al.

[11] Patent Number: 5,002,289
[45] Date of Patent: Mar. 26, 1991

[54] BI-DIRECTIONAL OIL SEAL WITH LEAKAGE RECOVERING RIB FORMATIONS

[75] Inventors: Hiroyoshi Yasui; Teruo Ojima; Michitoshi Mitsumaru, all of Osaka, Japan

[73] Assignee: Koyo Seiko Co., Ltd., Osaska, Japan

[21] Appl. No.: 364,124

[22] Filed: Jun. 12, 1989

[30] Foreign Application Priority Data

Jun. 13, 1988 [JP] Japan .................. 63-145393

[51] Int. Cl.⁵ ............................... F16J 15/32
[52] U.S. Cl. ...................... 277/134; 277/153
[58] Field of Search ............. 277/133, 134, 152, 153, 277/207 R

[56] References Cited

U.S. PATENT DOCUMENTS

| 3,923,315 | 12/1975 | Hadaway | 277/134 |
| 4,084,826 | 4/1978 | Vossieck et al. | 277/134 |
| 4,399,998 | 8/1983 | Otto | 277/134 |

FOREIGN PATENT DOCUMENTS

| 611018 | 10/1960 | Italy | 277/134 |
| 888198 | 1/1962 | United Kingdom | 277/134 |
| 1196451 | 6/1970 | United Kingdom | 277/134 |
| 1302199 | 1/1973 | United Kingdom | 277/134 |

Primary Examiner—Allan N. Shoap
Assistant Examiner—Scott Cummings
Attorney, Agent, or Firm—Birch, Stewart, Kolasch & Birch

[57] ABSTRACT

An oil seal comprises a seal body, a lip, and a plurality of ribs provided on a bevel facing a space without oil when the inner circumference of the lip is utilized. The plurality of ribs are included an angle with respect to the rotational direction of a shaft. Rear ribs with respect to the rotatational direction are set longer than the front ribs. Effecive oil recovery is enabled by the rib structure from the front ribs to the rear ribs.

6 Claims, 2 Drawing Sheets a groove formed between adjacent ribs can be aligned axially.

BI-DIRECTIONAL OIL SEAL WITH LEAKAGE RECOVERING RIB FORMATIONS

BACKGROUND OF THE INVENTION

The present invention relates to an oil seal for use between two relatively movable members and, more particularly, to a seal which serves to recover oil leakage with a pumping effect, the oil seal being provided at the sides of a differential gear used for the transmission system of motor vehicles.

An oil seal is provided to a rotation shaft for recovering oil. To restrict frictional resistance between the rotation shaft and the oil seal, the oil seal makes a line-contact with the shaft at the inner face of the shaft. Portions of the seal positioned beside the line-contact at the inner face have a bevel surface which becomes greater further from the surface of the shaft as they become closer to openings at the edges of the oil seal. Ribs are provided at a bevel at a side corresponding to a space without oil, each rib presenting an angle of attack against the positive and negative rotation directions of the shaft. When oil goes beyond the line-contact position from an oil-containing space during the rotation of the shaft, the oil can be recovered by the pumping function of the ribs.

Various structures of the ribs in such an oil seal have been proposed in U.S. Pat. Nos. 3,504,920, issued Apr. 7, 1970, 3,923,315, issued Dec. 2, 1975 and 3,934,888 issued Jan. 27, 1976. However, the conventional oil seals cannot sufficiently recover oil to prevent oil leakage.

SUMMARY OF THE INVENTION

With the foregoing in mind, it is an object of the present invention to provide an improved oil seal for effectively recovering oil leakage which is otherwise leaked in the positive and negative rotation directions of a shaft.

Briefly, described, in accordance with the present invention, an oil seal comprises an annular seal body, a lip provided integrally at the inner circumference of the annular seal body, the lip having a outwardly spreading bevel which is positioned at a space without oil, in the case where the inner circumference of the annular seal body is utilized, and a plurality of ribs provided on the bevel, the ribs forming an angle of attack with respect to the rotational direction of an inserted shaft, so that the rear ribs with respect to the rotation direction of the shaft are set longer than the front ribs with respect to the rotation direction.

BRIEF DESCRIPTION OF THE DRAWINGS

The present invention will become more fully understood from the detailed description given hereinbelow and the accompanying drawings which are given by way of illustration only, and thus are not limitative of the present invention and whrerein.

DETAILED DESCRIPTION OF THE INVENTION

Figure 1:
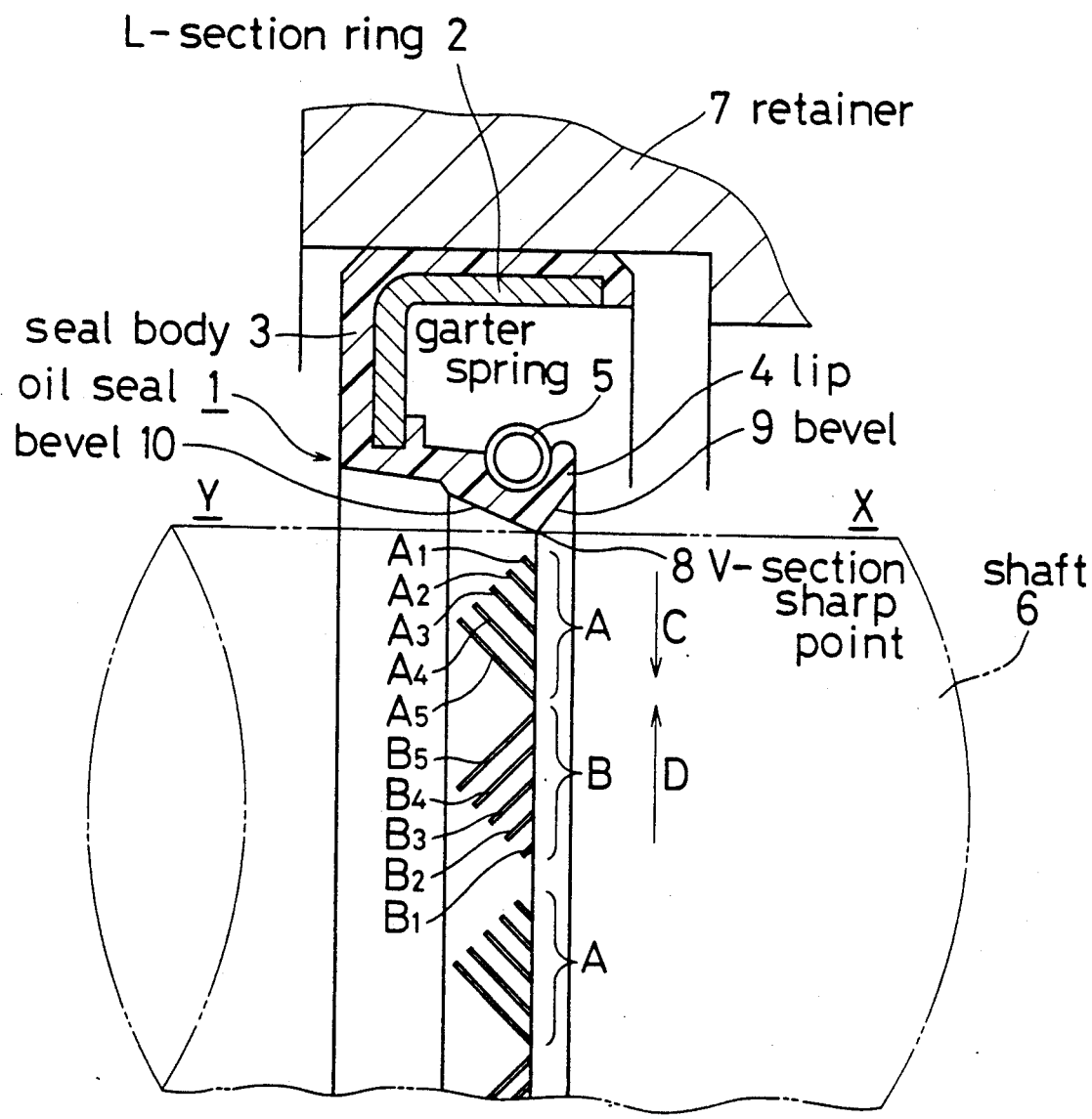
FIG. 1 is a cross-sectional view of an oil seal according to a first preferred embodiment of the present invention.

Referring to FIG. 1, an oil seal 1 of the first preferred embodiment of the present invention comprises an appoximately L-section ring 2, a seal body 3 fixed to the L-section ring 2, a lip 4 of the seal body 3, and a garter spring 5 for embracing the outer circumference of the lip 4. The oil seal 1 is interposed between a shaft 6, as indicated by a two-dot chain line, and a retainer 7 for covering the shaft 6.

An approximate V-section sharp point 8 is provided at the inner circumference of the lip 4. A bevel 9 at one side of the sharp point 8 is positioned at the inner side of the oil seal so as to face a space X containing oil while another bevel 10 at the other side of the sharp point 8 is positioned at the outer side of the oil seal so as to face another space Y, the atmosphere. On the outer bevel 10, two series of ribs A ($A_1$-$A_5$) and B ($B_1$-$B_5$) are alternately arranged in a circumferential direction. In particular, the length of the two series of individual ribs $A_1$ through $A_5$ and $B_1$ through $B_5$, for extending toward the space Y, varies from one other. The first ribs $A_1$ and $B_1$ positioned at the front of the rotation direction of the shaft 6 have the shortest length while the rear ribs $A_2$ through $A_5$ and $B_2$ through $B_5$ have gradually longer lengthes, in the rotation direction.

Figure 2:
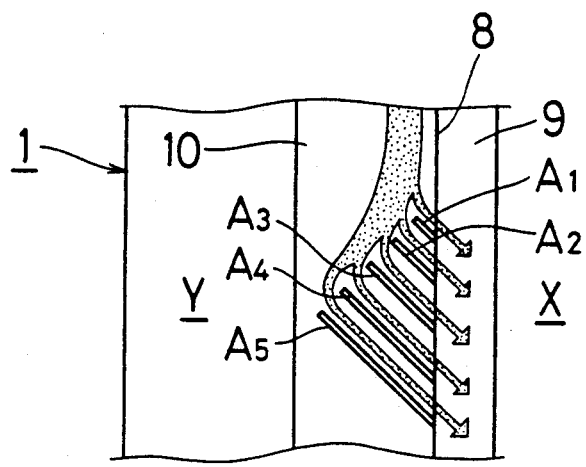
FIG. 2 is a drawing for explaining the operation of the oil seal of FIG. 1.

FIG. 2 shows an operation of the rib structures as shown in FIG. 1. When the shaft 6 rotates in a positive direction, as shown by arrow C of FIG. 1, leaking oil flowing along the positive direction of the shaft 6 is first stopped by the first rib $A_1$, as shown in FIG. 2. Overflow leaking oil is then stopped by the second rib $A_2$, and further the third rib $A_3$, and so on. Thus, leaking oil can be distributed onto a plurality of ribs $A_1$ through $A_5$. The thus received oil is returned to the oil-containing space X by the pumping effect of the respective ribs $A_1$ through $A_5$.

Similarily, when the shaft 6 rotates in the reverse direction, as shown by the arrow D of FIG. 1, leaking oil is recovered by the pumping effect of the respective ribs $B_1$ through $B_5$.

Thus, leaking oil is distributed to the respective ribs $A_1$ through $A_5$ or $B_1$ through $B_5$ and recovered with good effeciency. While the oil recovery can be achieved in the bidirectional way, one group of ribs does not serve to recover oil at a time when another series of ribs are being used to recover oil.

Figure 3:
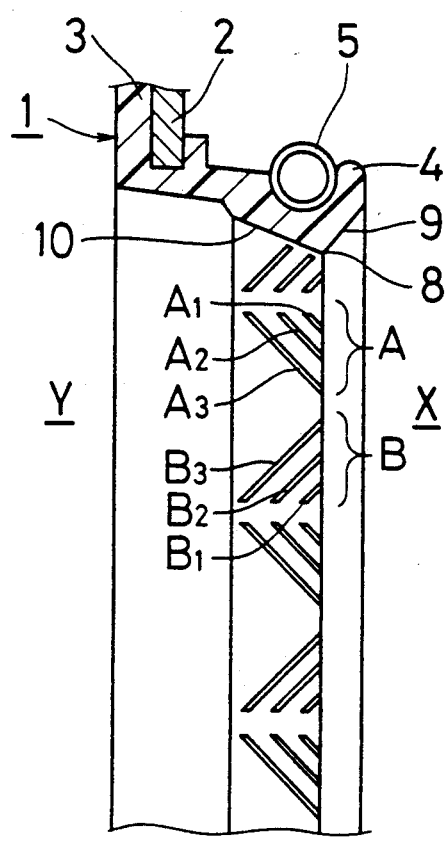
FIG. 3 is a cross-sectional view of another oil seal according to a second preferred embodiment of the present invention.
Figure 4:
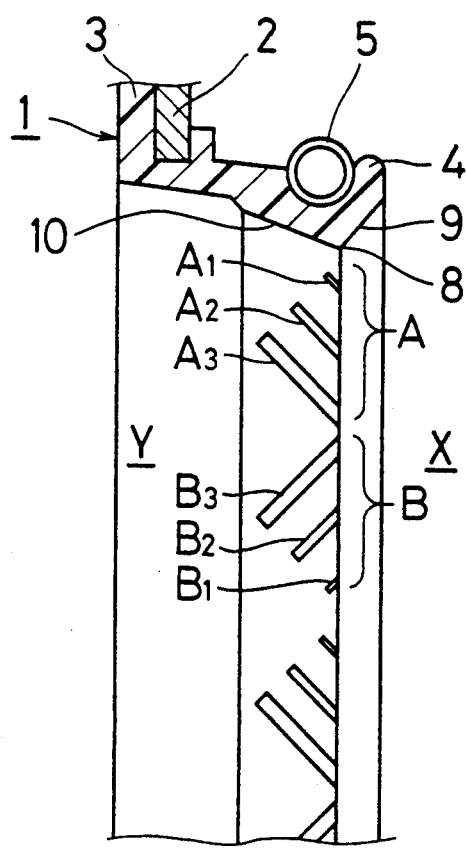
FIG. 4 is a cross-sectional view of a further oil seal according to a third preferred embodiment of the present invention.

FIGS. 3 and 4 show the other preferred embodiments of the present invention. In these embodiments, two series of three ribs $A_1$ through $A_3$ and $B_1$ through $B_3$ are provided. The oil seal 1 of FIG. 3 is provided with two series of three ribs $A_1$ through $A_3$ and $B_1$ through $B_3$ whose leading edges at the side of the space Y are lined aligned in the axial direction. Therefore, every inlet for a groove formed between adjacent ribs can be aligned axially.

The oil seal 1 of FIG. 4 is provided with two series of ribs $A_1$ through $A_3$ and $B_1$ through $B_3$, whose lengthes are similar to those of the oil seal 1 of FIG. 1. The height or width of the ribs $A_1$ through $A_3$ and $B_1$ through $B_3$ becomes greater according to the rear position of the ribs in the rotation direction.

The following is an comparison between the conventional case and the present invention in terms of oil recovery by the pumping effect.

TABLE A

| rotation number of shaft | Rib structure | | |
|---|---|---|---|
| | I | II | III |
| 1,000 rpm | 2 ml/h | 3 | 5 |
| 2,000 | 7 | 10 | 20 |
| 3,000 | 25 | 40 | 45 |

I: the conventional case provided with two series of single-lined ribs

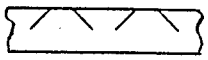

II: the conventional case provided with two series of ribs whose edges are extended in a line at a direction perpendicular to the axial direction.

III: the rib structure of the present invention as shown in FIG. 3.

Table A demonstrates the superiority of the rib structure of the present invention in connection with oil recovery efficiency. According to the rib structure of FIG. 3, for example, the number of the ribs in a group of ribs is more than that of the conventional case I of Table A while the number of the groups of ribs within an extension of the bevel 10 is more than that of the conventional case II of Table A with in a same extension of the bevel 10.

That is, the total number of the ribs over the entire circumference can become greater than in the conventional case. This results in good efficiency of oil recovery according to the rib structure of the present invention.

As described above, in accordance with the present invention, the length of the rear ribs in the rotation direction of the shaft, extending outside the oil seal, becomes longer than that of the front ribs, in the rotation direction of the shaft, extending outside the oil seal. This enables leaking oil from the front ribs in the rotation direction to the rear ribs, to be received and distributed by the respective rear ribs. The pumping effect of the respective front and rear ribs recovers oil effectively. While oil recovery is possible in both the positive and negative rotation directions of the shaft, one series of ribs does not help prevent oil leakage toward the space Y at a time when the other series of ribs is being used to recover oil.

While only certain embodiments of the present invention have been described, it will be apparent to those skilled in the art that various changes and modifications may be made therein without departing from the spirit and scope of the present invention as claimed.

What is claimed:

1. An oil seal comprising:
   an annular seal body into which a shaft is insertable;
   a lip provided integrally with said seal body at an inner circumferential portion of said annular seal body, said lip having a V-shaped portion at its inner circumference, having an inner bevel facing a space containing oil and an outer bevel facing a space without oil; and
   a plurality of sets of ribs, each set comprising an alternating first and second series of ribs provided on said outer bevel of said lip, each set being arranged circumferentially around said outer bevel, said ribs of said first and second series being inclined at first and second opposing angles, respectively, with respect to a rotation direction of said shaft and separated from each other in a circumferential direction, each series comprising a multiplicity of ribs said ribs of one of said first and second series being of gradually increasing lengths with respect to the direction of rotation of said shaft and said ribs of said other of said first and second series being of gradually decreasing lengths with respect to the direction of rotation of said shaft having a corresponding rib of substantially equal length in an alternating series being, said ribs of each series separated from each other in the circumferential direction.

2. The oil seal as set forth in claim 1, wherein the number of ribs in each alternating series is the same.

3. The oil seal as set forth in claim 2, wherein distances in a circumferential direction between the ribs facing each other become greater as the ribs are positioned more outwardly.

4. The oil seal as set forth in claim 2, wherein the distances in a circumferential direction between the ribs facing each other remain constant.

5. The oil seal as set forth in claim 2, wherein the height of the ribs facing each other becomes greater as the ribs are positioned more outwardly to the rotational axis.

6. The oil seal as set forth in claims 2 or 5, wherein the width of said ribs facing each other becomes greater as the ribs are positioned more outwardly to the rotational axis.

* * * * *